(12) United States Patent
Sridhar et al.

(10) Patent No.: US 11,811,621 B2
(45) Date of Patent: Nov. 7, 2023

(54) SYSTEM AND METHOD FOR QUALITY OF EXPERIENCE MANAGEMENT THROUGH THE ALLOCATION OF BANDWIDTH PER SERVICE CATEGORY

(71) Applicant: Sandvine Corporation, Waterloo (CA)

(72) Inventors: Kamakshi Sridhar, Plano, TX (US); Alexander Havang, Malmo (SE)

(*) Notice: Subject to any disclaimer, the term of this patent is extended or adjusted under 35 U.S.C. 154(b) by 0 days.

(21) Appl. No.: 17/339,062

(22) Filed: Jun. 4, 2021

(65) Prior Publication Data

US 2021/0385137 A1    Dec. 9, 2021

Related U.S. Application Data

(60) Provisional application No. 63/034,474, filed on Jun. 4, 2020.

(30) Foreign Application Priority Data

Jun. 3, 2021 (EP) ..................... 21177633

(51) Int. Cl.
*H04L 41/5009* (2022.01)
*H04L 41/0896* (2022.01)
(Continued)

(52) U.S. Cl.
CPC ...... *H04L 41/5009* (2013.01); *H04L 41/0896* (2013.01); *H04L 43/08* (2013.01); *H04L 47/22* (2013.01)

(58) Field of Classification Search
CPC . H04L 41/5009; H04L 41/0896; H04L 43/08; H04L 47/22
See application file for complete search history.

(56) References Cited

U.S. PATENT DOCUMENTS 7,292,531 B1 * 11/2007 Hill ..................... H04L 43/0882
370/230.1
7,551,623 B1 *  6/2009 Feroz .................. H04L 43/0858
709/224

(Continued)

FOREIGN PATENT DOCUMENTS

EP    3633939 A1    4/2020

OTHER PUBLICATIONS

European Patent Office, European Search Report for Corresponding EP Pat. App No. 21177633.1, dated Oct. 27, 2021.
(Continued)

*Primary Examiner* — Viet D Vu
(74) *Attorney, Agent, or Firm* — Amarok IP Inc.; Neil W. Henderson

(57) ABSTRACT

A system and method for Quality of Experience (QoE) management on a network. The method including: determining a set of service categories for an operator's traffic, wherein at least one of the service categories is video streaming; mapping a plurality of traffic flows to each of the service categories; determining a target and minimum intent for each of the service categories; measuring a score and bandwidth use for each of the service category; determining whether each of the service categories are reaching an associated minimum bandwidth intent; if the minimum bandwidth intent is not being reached for at least one service category, adjusting the minimum intent for at least one of the service categories; allocating a bandwidth per service category based on the adjusted minimum intent; and shaping the traffic flow to the allocated bandwidth; otherwise allowing the traffic flow to continue with a current bandwidth allocation.

18 Claims, 9 Drawing Sheets

(51) Int. Cl.
  *H04L 43/08* (2022.01)
  *H04L 47/22* (2022.01)

(56) References Cited

U.S. PATENT DOCUMENTS

| | | | |
|---|---|---|---|
| 7,738,375 | B1 | 6/2010 | Vinokour et al. |
| 2003/0069973 | A1 | 4/2003 | Ganesan et al. |
| 2003/0126233 | A1 | 7/2003 | Bryers et al. |
| 2004/0013119 | A1 | 1/2004 | Melampy et al. |
| 2008/0155087 | A1 | 6/2008 | Blouin et al. |
| 2009/0059791 | A1* | 3/2009 | Saxena ............... H04L 41/0896 370/235 |
| 2010/0188975 | A1 | 7/2010 | Raleigh |
| 2011/0019572 | A1* | 1/2011 | Lemaire ............. H04L 12/5601 370/468 |
| 2014/0334309 | A1 | 11/2014 | Mihály et al. |
| 2016/0149815 | A1* | 5/2016 | Cotter .................... H04L 47/12 370/235 |
| 2017/0164379 | A1* | 6/2017 | Karlsson ................ H01Q 1/243 |
| 2017/0325120 | A1 | 11/2017 | Szilagyi et al. |
| 2019/0364457 | A1 | 11/2019 | Szilagyi et al. |
| 2020/0068440 | A1* | 2/2020 | Talbert ................ H04L 41/5019 |
| 2021/0288898 | A1* | 9/2021 | Shen ................... H04L 43/0882 |

OTHER PUBLICATIONS

Ben Ameur Chiheb et al., "Performance evaluation of TopHas: TCP for HTTP adaptive streaming", Multimedia Systems, ACM, New York, NY, US, vol. 24, No. 5, doi:10.1007/S00530-018-0587-8, ISSN 0942-4962, (Mar. 31, 2018), pp. 491-508, (Mar. 31, 2018), XP036602264.

* cited by examiner

PRESET
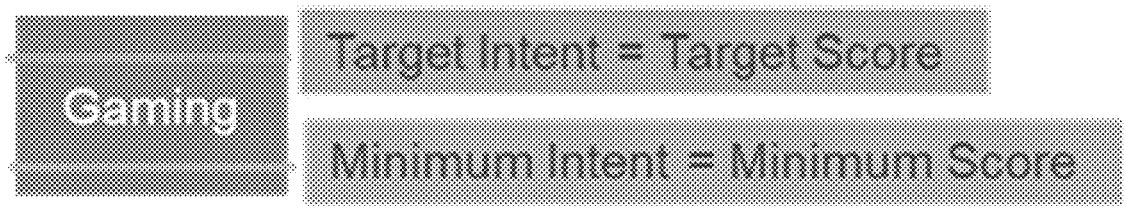
Figure 10
| Service Category | Target Intent Score (Notation) | Minimum Intent Score (Notation) | Lowest Possible Minimum Intent Score (Notation) |
|---|---|---|---|
| Streaming | 5 (P2) | 3 (P1) | 2 (P0) |
| Web | 5 (Q2) | 3 (Q1) | 2 (Q0) |
| Gaming | 4 (R2) | 3 (R1) | 1 (R0) |
| Background | 3 (S2) | 2 (S1) | 1 (S0) |
Figure 11
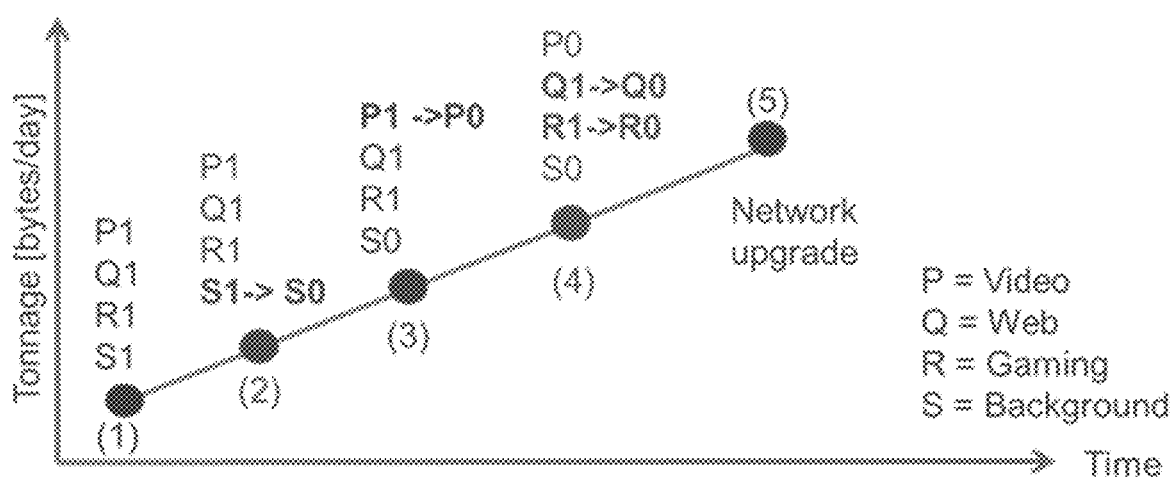
Figure 12

SYSTEM AND METHOD FOR QUALITY OF EXPERIENCE MANAGEMENT THROUGH THE ALLOCATION OF BANDWIDTH PER SERVICE CATEGORY

RELATED APPLICATIONS

The present application claims priority from U.S. Patent Application No. 63/034,474 filed Jun. 4, 2020 and European Patent Application No. 21177633.1 filed Jun. 3, 2021, which are hereby incorporated in their entirety herein.

FIELD

The present disclosure relates generally to management of computer network traffic. More particularly, the present disclosure relates to a system and method for video streaming management.

BACKGROUND

Network traffic continues to increase all over the world. Multiple software applications are contending for link capacity and link congestion varies dynamically as users enter and leave the network and run various applications. In this situation, various types of applications are contending for limited link capacity and traditionally each traffic type is allocated a certain percent of the overall network bandwidth. In addition to data plane traffic, there is a percent of bandwidth (typically fixed) allocated for network management or certain specific classes, for example, DNS signaling, which must go through.

Further, users tend to expect high quality of experience (QoE) for their applications, in particular, for example, video, voice and data applications. For streaming video, users expect to see the video with no stalls, and a consistently smooth QoE even under challenging radio and mobility conditions. For data, users expect fast download times, and for voice users expect high voice quality with no call drops. As such, there are often issues determining which traffic to prioritize during times when links are congested.

It is, therefore, desirable to provide an improved method and system for traffic management and, in particular, for video streaming management.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for Quality of Experience (QoE) management on a network, the method including: determining a set of service categories for a network operator's traffic; mapping a plurality of traffic flows to each of the service categories; determining a target and minimum intent for each of the service categories for the network operator; measuring a score and bandwidth use for each of the service category; determining whether each of the service categories are reaching an associated minimum bandwidth intent; if the minimum bandwidth intent is not being reached for at least one service category, adjusting the minimum intent for at least one of the service categories; allocating a bandwidth per service category based on the adjusted minimum intent; and shaping the traffic flow to the allocated bandwidth; otherwise allowing the traffic flow to continue with a current bandwidth allocation. In a particular case, at least one of the service categories is video streaming. In this case, the video streaming traffic may be a main target for managing the quality of experience from among the service categories.

In some cases, the set of service categories may include video streaming as a first service category and all other traffic as a second service category.

In some cases, the set of service categories may include a service category for each of background traffic, gaming traffic, web browsing traffic, video streaming traffic, and voice/messaging traffic.

In some cases, the minimum bandwidth intent may be adjusted for the background traffic service category prior to adjusting the minimum bandwidth intent for any other service category.

In some cases, the minimum intent for the video streaming traffic category may be lowered prior to any other service categories.

In some cases, minimum intent for each service category may not be lowered below a predetermined lower threshold.

In some cases, measuring the score and bandwidth for each service category may include: determining an average user score for a set of users having traffic flows associated with the service category.

In some cases, the average user score may be determined over a predetermined interval of time.

In some cases, the method may further include: monitoring the score and bandwidth for each service category; determining whether there has been a change in score and bandwidth for any of the service categories; if there has been a change and the score and a service category is no longer meeting the minimum intent, further adjusting the minimum intent for at least one of the service categories; allocating a bandwidth per service category based on the adjusted minimum intent; and shaping the traffic flow to the allocated bandwidth; otherwise allowing the traffic flow to continue with a current bandwidth allocation.

In another aspect there is provided a system for Quality of Experience (QoE) management on a network, the system including: a mapping module configured to determine a set of service categories for a network operator's traffic, wherein at least one of the service categories is video streaming and to map a plurality of traffic flows to each of the service categories; an analyzing module configured to determine a target and minimum intent for each of the service categories for the network operator, measure a score and bandwidth use for each of the service category and determine whether each of the service categories are reaching an associated minimum bandwidth intent; and a shaping module configured to adjust the minimum intent for at least one of the service categories if the minimum bandwidth intent is not being reached for at least one service category, allocate a bandwidth per service category based on the adjusted minimum intent and shape the traffic flow to the allocated bandwidth.

In some cases, the mapping module may be configured to determine video streaming as a first service category and all other traffic as a second service category in the set of service categories.

In some cases, the mapping module may be configured to service category for each of background traffic, gaming traffic, web browsing traffic, video streaming traffic, and voice/messaging traffic.

In some cases, the shaping module may be configured to adjust the minimum bandwidth intent for the background traffic service category prior to adjusting the minimum bandwidth intent for any other service category.

In some cases, the shaping module may be configured to adjust the minimum intent for the video streaming traffic category prior to any other service categories.

In some cases, the shaping module may be configured to not lower the minimum intent for each service category below a predetermined lower threshold.

In some cases, when measuring the score and bandwidth for each service category the analysis module may be configured to determine an average user score for a set of users having traffic flows associated with the service category.

In some case, the average user score may be determined over a predetermined interval of time.

In some cases, the system may further include: a monitoring module configured to monitor the score and bandwidth for each service category and determine whether there has been a change in score and bandwidth for any of the service categories; wherein, if there has been a change and the score and a service category is no longer meeting the minimum intent, the shaping module is configured to further adjust the minimum intent for at least one of the service categories; allocate a bandwidth per service category based on the adjusted minimum intent; and shape the traffic flow to the allocated bandwidth.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 10 illustrates an operator specified minimum and target intent for a given service category;

FIG. 11 illustrates an example of target, minimum and lowest possible minimum intent for various service categories;

FIG. 12 is a graph showing the management of video traffic across service categories;

DETAILED DESCRIPTION

Generally, the present disclosure provides a method and system for Quality of Experience (QoE) management (e.g. video streaming)). In some embodiments, the system and method are configured to determine a set of service categories for a network operator's traffic, wherein at least one of the service categories is video streaming traffic. The system and method may further determine a target and minimum bandwidth intent for video streaming traffic for the network operator. The system and method may then map a plurality of traffic flows to each of the service categories and measure a score and bandwidth use for the service categories. Further, the system and method may determine whether any of the service categories are reaching the minimum bandwidth intent. If the minimum bandwidth intent is not being reached for at least one service category; the system may adjust the minimum bandwidth intent for at least one of the service categories and allocate a bandwidth per service category based on the adjusted minimum intent. The system may then provide for the shaping of the traffic flow to the adjusted allocated bandwidth.

Figure 1:
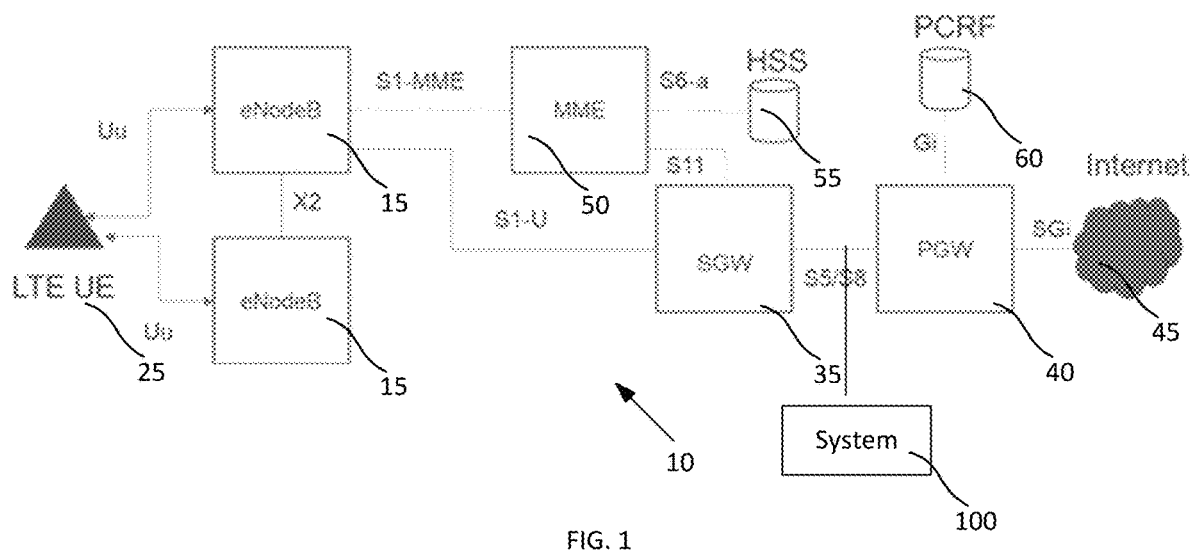
FIG. 1 illustrates an overview of a 3GPP LTE network architecture.

FIG. 1 shows a diagram of a Long Term Evolution (LTE) network 10 architecture. It will be understood that at least one Evolved Node Base station (eNodeB) resides within the LTE Radio Access Network (RAN). The eNodeB is designed to allocate the network resources among the various LTE users via their User Equipment (UE) 25. The RAN is in communication with the core network 30. The eNodeB 15 connects to the core network via a serving gateway (SGVV) 35, which is further in communication with a packet data network gateway (PGVV) 40, which is in communication with the Internet 45. The LTE network 10 further includes a Mobility Management entity (MME) 50, which is configured to track the LTE users. The MME 50 interacts with a Home Subscriber Server (HSS) database 55 to provide information with respect to the various users or subscribers 25 of the LTE 10. The LTE 10 includes a Policy and Charging Rules Function (PCRF) 60, which is intended to provide policy control and flow based charging decisions. It will be understood that FIG. 1 illustrates a high level network architecture and that an LTE network 10 may include further aspects not illustrated. In some cases, the system may be located on the Internet side of the PGW 40.

A system 100 for managing video streaming is intended to reside in the core network. In particular, the system 100 may include an inline probe north of the PGW 40, between the SGW 35 and PGW 40, or in another location where the system is able to access the data noted herein. It will be understood that in some cases the system 100 may be a physical network device, or may be a virtual network device. In some cases, the system 100 may send data to the cloud to be processed or the system may process the data internally. One of skill in the art will understand that cloud processing includes processing by a remote processor and use of remote memory to store data during processing. Although FIG. 1 illustrates an LTE network, it will be understood that the system may be used on any Internet Protocol (IP) based networking system, for example, WiFi based, mobile data networks like GPRS, CDMA, 4G, 5G, satellite based, WLAN based networks, fixed line broadband fiber optic networks as well as on virtual private networks (VPNs). FIG. 1 is intended to illustrate a general environment but embodiments herein may be adapted for other environments.

In this disclosure, embodiments of the system and method disclosed herein are described in relation to a Radio Access Network between the LTE UE and the eNodeB. LTE radio networks are increasingly congested due to high volumes of mobile traffic. Conventional solutions, for example, the deployment of higher spectral efficiencies with LTE-A Carrier Aggregation and CoMP features have helped, but the networks are still experiencing congestion.

With the availability of rich video content from content providers, mobile users are consuming increasingly larger amounts of data. It has been observed that video applications can consume approximately 65-70% of cell traffic and this percentage is expected to continue to grow as higher bandwidth 4K content becomes more widely available. Capacity in the radio network is needed to support applications like 4K, 8K video and from other sources such as TikTok™, Netflix™, YouTube™ and the like. Higher resolution video content is expected to drive up the cost of the radio network. Users expect high QoE for all applications including, video, web, gaming, voice and other applications. For streaming video, users expect to see video (i.e. picture frames) with no stalls, and a consistently smooth QoE, even under challenging radio and mobility conditions. For data, users expect fast download times. For voice, users expect high voice quality with no call drops. This growing trend of increased user data consumption and user expectation of high QoE requires operators to manage cell congestion effectively while delivering good user QoE for a majority of its users across the various applications.

Embodiments of the system and method detailed herein are intended to manage the growth of video streaming to help operators maximize the utilization of the operator's radio assets, and deliver optimal user QoE across various applications, before, for example, investing in additional radio assets.

Figure 2:
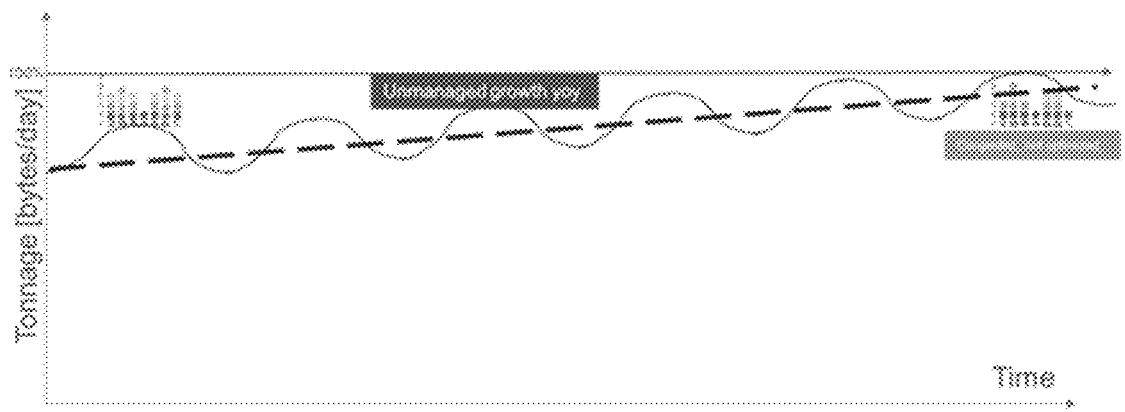
FIG. 2 illustrates radio capacity growth year over year.

FIG. 2 illustrates an example of potential year over year growth of video traffic in a network. The x-axis represents time. The y-axis represents the volume of video traffic in the network, referred to as video tonnage. The unit of y-axis is traffic bytes sent per day or week. In an unmanaged cell, where there is no other volume based congestion management in place, the traffic volume grows over time. The dotted line shows the average tonnage trending up over weeks and months. Within a week or a month, there is a natural cyclical variance of traffic growth depending on, for example, weekend versus weekday traffic, special events that cause traffic to spike, seasonal trends, or the like. In an unmanaged network, the growth of video traffic may result in high congestion for a significant duration of the day resulting in poor QoE for a majority of its users. With an unconstrained growth of traffic, the network operator has to invest capital expenditure (CAPEX) to increase the Radio Access Network (RAN) capacity in order to prevent user churn.

Figure 3:
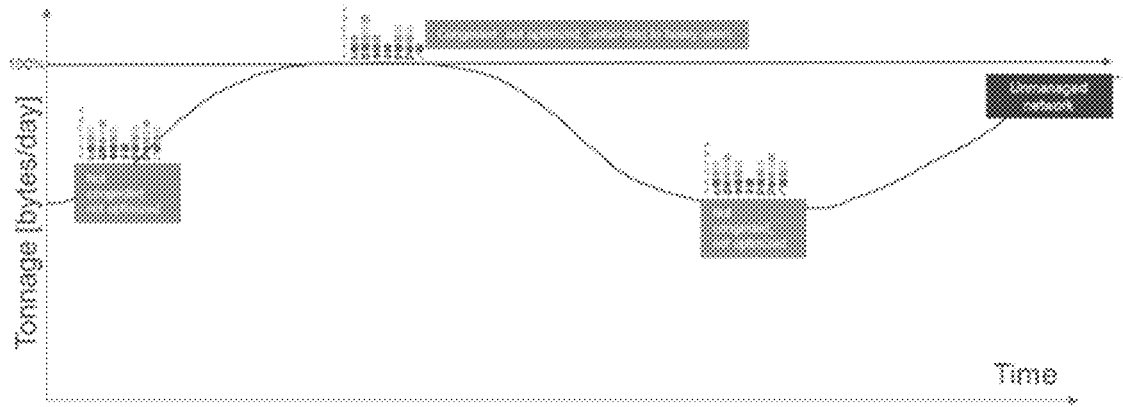
FIG. 3 illustrates an example of network traffic variation within a day.

FIG. 3 is a graph illustrating traffic variation within a day. In an unmanaged network, when traffic volume is low, for example, during the night, the QoE of the users will likely be good. During peak hours for example, evening times or weekends, the network would likely be congested. Video users who tend to have long duration flows are likely taking up much of the radio resources resulting in poor QoE for other users. The reasons for this are detailed herein.

RAN schedulers are intended to allocate their radio resources Physical Resource Blocks (PRBs) to maximize the spectral efficiency while continuing to allow for fairness amongst the users scattered around the cell in both good radio conditions and poor radio conditions. Generally, users tend to be roughly uniformly distributed across good channel conditions and poor channel conditions such as on cell edge.

Users in a RAN are scattered so that there is a distribution of users in good Radio Frequency (RF) conditions and poor RF conditions. At each LTE Transmission Time Interval (TTI) (which may be, for example, 1 millisecond (ms)), users close to the base station and in good channel conditions, reporting good Channel Quality Indicator (CQI) will be allocated more Physical Resource Blocks (PRB) at higher Modulation and Coding Scheme (MCS) by the RAN scheduler compared to users reporting poor CQI values who may either be close to the cell edge or may simply be in poor channel conditions near the cell. Users at the cell edge in poor RF conditions may additionally witness interference from neighboring cells, resulting in substantial loss of throughput.

Proportional Fairness schemes within the MAC scheduler aim to balance the need to maximize spectral efficiency with the need to ensure fairness amongst various users within the cell. An optimization function is computed at each TTI interval by the RAN scheduler in deciding how many PRBs to allocate to a user. The RAN scheduler is typically effective in maintaining user fairness over short durations through the proportional fair scheduling method that is implemented within the eNB. However, the eNB may be unable to maintain fairness over longer durations, such as several tens of seconds and longer. Typically, users who are in good channel conditions get incrementally more radio resources. Over time, this cumulatively aggregates for long duration flows. As a result, few users (for example, approximately 5% of users) are able to get significantly larger proportion of the radio resources compared to other users resulting in much higher sustained throughputs over longer durations. This effect results in very good QoE for a few users and poor QoE for several other users and it has been noticed that this pattern is particularly exacerbated for long duration flows.

This problem of poor user QoE may often be compounded by the fact that operators like to maximize Spectral Efficiency as much as possible because this enables them to substantiate a statement such as: 'the network with the highest throughput'. Fairness amongst users is generally a lower priority to the operator.

Embodiments of the method and system disclosed herein are intended to provide techniques to manage the capacity growth in the RAN due to high consuming bandwidth applications like video. By managing the growth and flow of video traffic to acceptable levels, the operator can selectively curb video utilization on congested cells in an automated way to allow for desired and acceptable QoE for video and other categories of use, for example, gaming, web, voice and the like. The management of video traffic utilization is based on setting a threshold, referred to herein as "an intent", that is a target value intended to appropriately reflect the desired QoE of the video quality, for example, SD, HD, 1080p, 4K, 8K and the like. In addition, intents and/or thresholds may be set for other service categories. Thus, a majority of the users in various other service categories get a good QoE even when video tonnage grows. Further, the management of video traffic volume (or tonnage) in a controlled manner may further free up bandwidth for new subscribers, or save the capital expenditure (CAPEX) that might otherwise be needed for keeping up with unmanaged growth.

There are conventional RAN based congestion management approaches. One approach may be deprioritization in the RAN. Deprioritization generally uses priority weight functions within the eNB scheduler that underweight the heavy users in the eNB scheduler to achieve a similar, if not higher, increase in the throughputs experienced by the non-heavy users. The result of deprioritization is that the RAN scheduler shifts resources from heavy users to typical users.

There may be some limitations to this conventional deprioritization method. The RAN scheduler may do an effective job of scheduling incoming user traffic and allocating appropriate number of radio resources to ensure fairness over short time scales. In the RAN, there is no awareness of the type of application associated with the traffic flow (other than the LTE QCI (0 to 9)) when deciding which users to deprioritize. Since all applications practically fall under the best effort category of LTE QCI 8 or 9, the RAN does not have an appropriate level of visibility to selectively shape different heavy users for optimal RAN performance based on, for example, the category or application of the traffic flow, for example, peer-to-peer, video streaming flows, web traffic, or the like.

The RAN typically does not have knowledge of end-to-end network performance statistics for a flow. As such, the RAN does not have visibility into the Round Trip Time (RTT) or packet loss on the backhaul between the eNB and the aggregation network, the aggregation network and the SGW, and between SGW and the PGW. Backhaul bottlenecks, which have been shown to be common, can severely skew a perceived flow performance. Therefore these may alter the optimal assignment of radio resources needed to provide optimal QoE.

Thus, conventional RAN deprioritization techniques may not increase the QoE of the majority of the users because there is no contextual awareness used to decide which users to shape and by what extent.

Another conventional network based congestion management solution may involve managing heavy users. Heavy user management techniques shape the heavy users based on predefined policies. Since this conventional solution is static and focused only on heavy users, it is generally limited in impact.

Still another conventional approach may be to allocate video traffic a fixed percentage of the overall cell bandwidth at any time in a static manner. Other applications may be allocated a certain fixed percentage as well, or may otherwise share the remaining bandwidth. However, this static allocation approach does not consider the user QoE metrics of either the video or the other service categories and is not dynamically responsive to variations and growth in video traffic volume over time.

Figure 4:
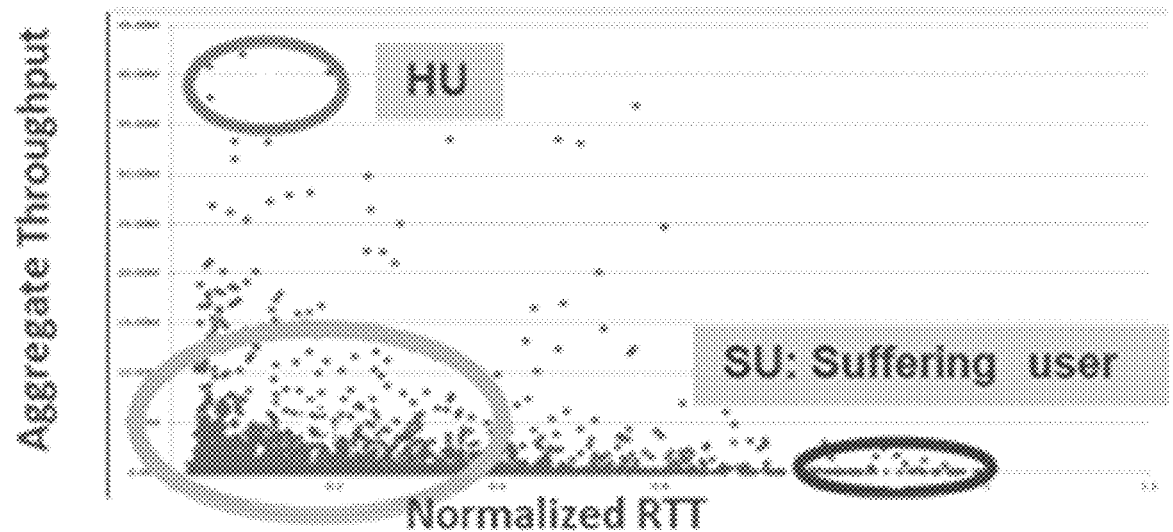
FIG. 4 illustrates automated congestion management.

A further network based congestion management approach may be automated RAN congestion management. This approach automates the shaping of heavy users to improve the QoE of suffering users who are experiencing high round trip times. By shaping the heavy users, radio resources that were taken by the heavy users are freed up for use by other users within the cell. This includes those users, labeled as suffering users, who are in poor channel quality conditions and thus are not getting serviced frequently enough by the radio scheduler. With heavy user shaping, for one or more applications, the suffering users now get a chance to be serviced by the radio scheduler more often. Since these packets are removed out of their queues more quickly, the latency of packets of the suffering users is intended to be lowered. This generally improves the throughput of TCP and certain UDP applications (for example, Quick UDP Internet Connection (QUIC)) of suffering users, as the source applications will keep their window sizes larger, in response to lower end-end latency. It permits higher number of users to experience better QoE. FIG. 4 is a graph illustrating measurements with heavy users and suffering users.

As heavy users are shaped in an automated manner, the Round Trip Time of suffering users improves because the radio resources that were allocated to the heavy users are now additional freed up to be allocated to the suffering users.

The automated RAN congestion management method is intended to improve the QoE of suffering users. However, the video traffic sent by normal users may continue to grow unabated because it may not be shaped or reduced at all. Since the normal users are usually a majority of the total number of users, the total volume of video traffic within the cell may still be high. The total video tonnage may not be reduced in this method and may continue to exert pressure on the RAN capacity. As the total video tonnage in the cell increases, it may result in a larger number of suffering users who experience poor QoE.

These conventional schemes do not appear to address improving the QoE of suffering users due to increase in video traffic volume of the normal users. Hence the operator generally proceeds by adding capacity to the RAN through additional spectrum or other network upgrades. Furthermore, automated RAN congestion management may not assess the impact of the QoE on the other traffic categories. Therefore the extent of shaping is not necessarily optimal with respect to the traffic mix in a given cell.

Embodiments of the system and method detailed herein are intended to automatically manage video traffic in the network for all users while delivering an acceptable QoE for users of various service categories such as video, web, gaming, voice and the like. The growth in video traffic is measured and the impact of the video tonnage may be reduced to acceptable levels to meet the QoE requirements of other service categories. This adjustment/management of video tonnage is achieved through updating the shaping of the video traffic periodically, for example, every few minutes, and observing the user QoE impact across service categories. As video tonnage grows, a reduction in QoE is needed only to the extent that is enough to allow for the QoE for other service categories to be acceptable. Likewise, the QoE of the other service categories may be reduced enough to be acceptable to the subscribers. At some point, the video traffic is likely to grow so high that the lowest QoE levels of either video or the other service categories cannot be maintained. At that point, the network operator may have no other option but to upgrade the network to maintain an acceptable level of QoE. Embodiments of the system and method detailed herein are intended to provide for the growth of video traffic to be managed at acceptable levels without significantly and negatively impacting the QoE.

Figure 5:
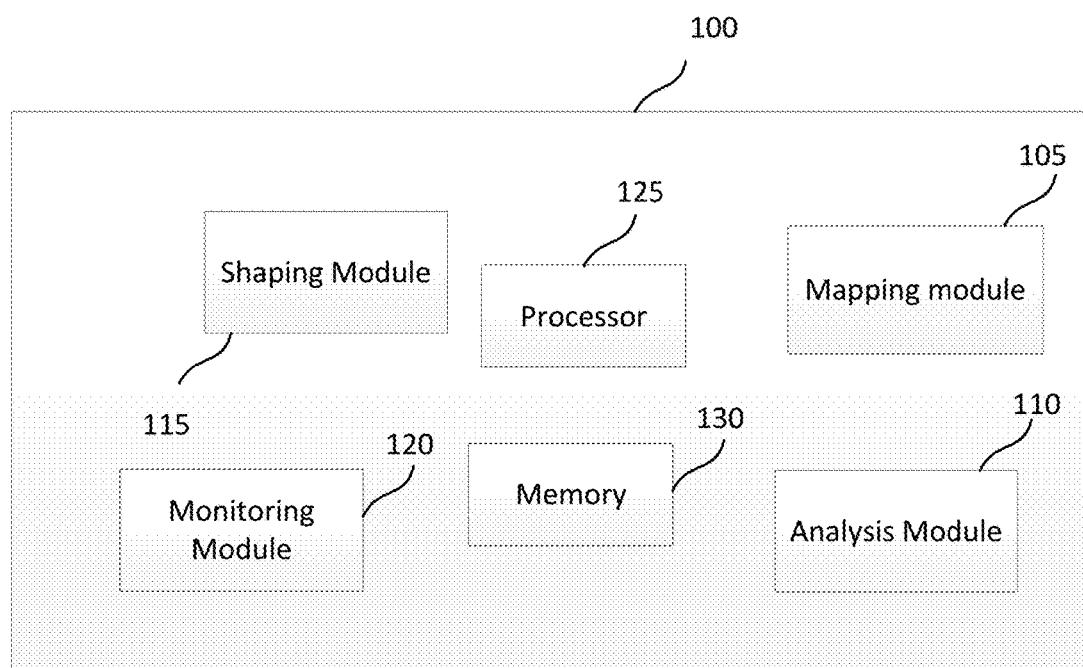
FIG. 5 illustrates a system for Quality of Experience (QoE) management according to an embodiment.

FIG. 5 illustrates a system 100 for managing video streaming traffic according to an embodiment. The system includes a mapping module 105, an analysis module 110, a shaping module 115, a monitoring module 120, a processor 125 and memory 130. In some cases, the system 100 may include a plurality of processors, for example, including at least one processor per module or per engine. In some cases, the system 100 may be distributed and may be housed in a plurality of network devices. In other cases, the system may reside in a single network device. In some cases, the memory 130 may be included as an internal component of the system. In other cases, the memory component 130 may be housed externally or in a cloud and may be operatively connected to the system and the components of the system. The processor 125 may be configured such that it will execute the instructions stored in memory to provide the modules their intended operations. The system is intended to reside on the core network, for example, the system may reside at SGi or S1-U. In some cases, the system may include at least one shaper configured to shape the traffic as determined by the shaping module 115 while in other cases, the system may work with external shapers.

The mapping module 105 is configured to determine a service category of network traffic flows. In general, different types of applications are mapped to various service categories for determining traffic flow categories. Video traffic including long form and short form flows may be mapped to a video service category or to a plurality of service categories depending on the predetermined service categories of the network operator. Web traffic may be mapped to a web service category. Gaming traffic may be mapped to a gaming service category, and similarly other applications may be mapped to various service categories. The mapping module 105 is configured to determine the service category of each traffic flow by determining an application or service associated with the traffic flow and mapping the traffic flow to the service category.

The analysis module 110 is configured to analyze each service category. Each service category is allocated a minimum intent, a target intent and a maximum intent, which may be predetermined or may be configured by the network operators. The intent reflects the operator expected QoE for that service category. Therefore, the unit of the intent measurement is intended to be the same as the unit of a QoE score. In some cases, score values may range from 1 to 5, with 1 corresponding to the lowest QoE and 5 corresponding to the highest QoE, although other scales may be used. The minimum and maximum Intent scores may be established based on the QoE desired for the respective service category. It will be understood that the higher the minimum intent score (referred to herein as a minimum intent) would imply a higher minimum bandwidth allocation for that specific service category. The translation of the intent to the bandwidth allocation may be done through, for example, a transformation matrix mapping table. The transformation matrix table may be a lookup table. Every intent score value is mapped to an equivalent bandwidth for that service category. The analysis module 110 is configured to use a variety of measurements such as enterprise-to-enterprise RTT, throughput, loss, and the like to determine a traffic flow score for a service category.

The shaping module 115 is configured to determine the bandwidth allocation per service category. In some cases, the bandwidth allocation depends on the average user scores compared to either the target or minimum intent. The choice of target or minimum intent may be decided based on comparing average user scores first to the target intent. If enough bandwidth is not available from the total available budget, then the average user scores is compared to the minimum intent. Accordingly, the bandwidth allocated will help meet that minimum intent. Bandwidth allocation is intended to be an input to shaping that is to be applied per service category by at least one shaper operatively connected to the shaping module 115. The shaping module 115 may be operatively connected to at least one shaper, or the shaper may be part of the shaping module. The shaping module 115 is configured to provide for the at least one shaper to shape each of the service categories to the determined bandwidth allocation. The average user score may be obtained by collecting and measuring score samples, for example over 250 ms 500 ms or the like, from the inline monitoring module 120. These samples may be aggregated to larger intervals over time, for example to 1 second, then 1 minute intervals. The samples may then be aggregated to a configurable time that represents the duration over which the score values are needed, for example, 2 minutes 5 minutes, or the like. It will be understood that the time intervals are configurable and may vary per network operator. The aggregated score values for each user may be summed up over all users and divided by the total number of users. The outcome represents the average user score for that subscriber category for that configurable time.

The monitoring module 120 is configured to monitor the traffic flow of the system to determine whether further shaping is required or if an appropriate level of QoE exists for the subscribers and/or users of the network based on measurements in the previous interval. This process is intended to be iterative. Every cycle, the monitoring module 120 may examine the measurements from the previous cycle and compares the measurements against the minimum and target intents for the respective service category. In some cases, depending on the comparison, adjustments may be made based on the intent.

Figure 6:
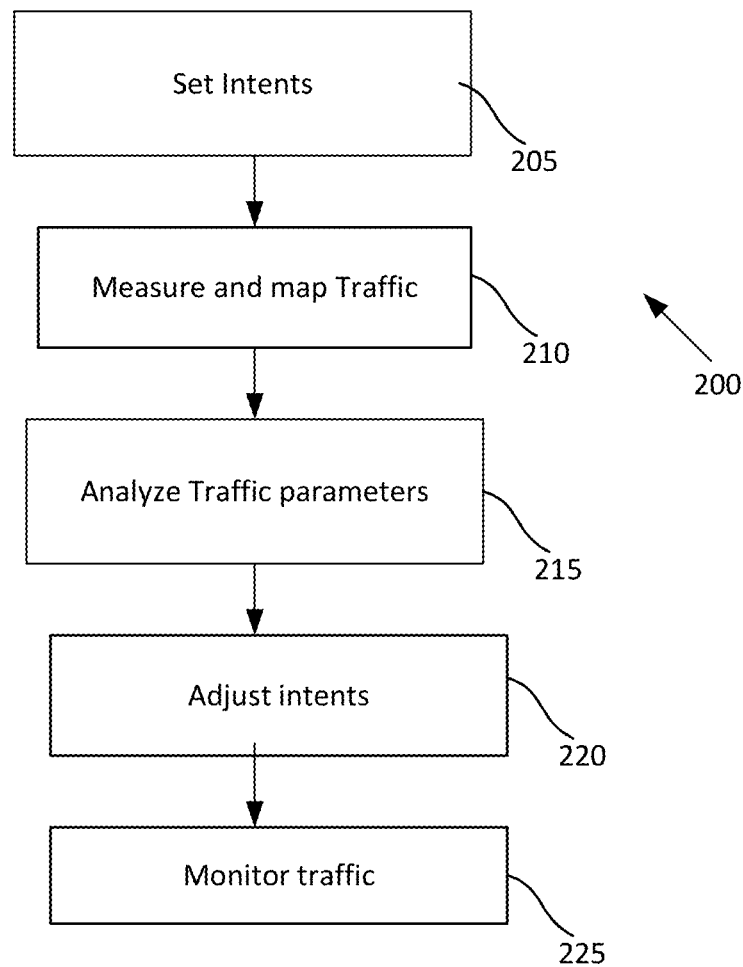
FIG. 6 illustrates a method for Quality of Experience (QoE) management according to an embodiment.

FIG. 6 illustrates a method for managing video streaming according to an embodiment. The system may have a minimum intent, target intent and a maximum intent preconfigured or defined by the network operator for each traffic service category, at 205. At 210, the mapping module 105 measures and reviews the traffic flow to map each flow to a service category. At 215, the analysis module 110 analyzes the traffic parameters, for example, for example, RTT, throughput and packet loss of each traffic flow and of each service category. Based on the analysis of the traffic parameters, the analysis module is intended to determine a QoE score for the traffic flow. The analysis module may aggregate a plurality of traffic flow QoE scores to determine a current score for each a service category. Based on the current score, in comparison to the current intent, with minimum intent may be amended for at least one service category. At 220, the shaping module 115 adjusts the intents, which may amend the shaping or prioritization of each of the service categories. At 225, the monitoring module 120 monitors the network traffic to determine if further amendments to the traffic prioritization should be done to benefit subscriber and/or user QoE.

If the measured average user score for that service category in the previous interval is lower than the target score for the service category, then more bandwidth is intended to be assigned in the next interval to that service category. Assignment of more bandwidth is intended to improve user score because more resources are available to transmit the bits, resulting in higher throughput and lower latency. Conversely, if the measured user score is close to the target score, then it presumes that the bandwidth allocation made in the previous time interval was good enough to be used for the next time interval. This represents closed loop feedback control where the system is continuously monitoring the output score and appropriately allocating network resources in a dynamic way to be responsive to traffic variations while maintaining the user QoE close to the desired intent of the target score. As the number of users rise within one or more service categories, there simply is not enough bandwidth to meet the target intent (user QoE) for those service categories. The measured user QoE may be measured against the minimum intent (minimum user QoE) in a similar manner as described above, through the described closed loop feedback mechanism.

In the embodiments of the method and system detailed herein, as the traffic grows within the network, the minimum and target Intents are changed in a specific sequence so as to ensure that the users in the respective service categories achieve a predetermined QoE. The lower bounds of the predetermined QoE are intended to be configured or pre-specified by the operator when the network operator determines the lowest level of the Minimum Intent for that service category In some cases, the QoE of a service category may be measured by a score of the service category. Within a service category, at a predetermined interval, for example, every 100 ms, 250 ms, 500 ms or the like, the score of a user is measured and recorded. Within each service category, several 250 ms score samples are likely to be available depending on the number of users of the network. These score samples may be aggregated to 1 minute intervals as described previously, although other intervals may be used. The number of aggregated score samples depends on the number of users. Sufficiently large number of aggregated user score samples must be collected to prevent the possibility that a few sets of samples would significantly skew the average outcomes of user QoE. Typically, a range of tens of samples (signifying tens of users) and beyond is enough to prevent a few outlier samples from skewing the outcomes. The variance of the score QoE outcomes is lower with a larger number of samples. An average of all user scores per predetermined interval can be computed, per service category. In an example where 250 ms is used, the average of a predetermined set of users for example, forty user, may be reviewed. This set of user scores can be computed per service category. This is referred to as the measured user QoE score for that specific service category.

Embodiments of the system and method detailed herein are intended to determine an estimate of the overall available RAN capacity (bits/sec). The system could use an estimate of the radio network capacity based on measurements of RTT of all the users, prior history of heavy users, suffering users, total users and their impact on the measured capacity. The determination of the RAN capacity may be accomplished by various methods known in the art. For embodiments of the system and method detailed herein, it is assumed that the RAN capacity is known. It may be preferable for the estimate of the RAN capacity to not be conservative. It is generally preferred to use a slightly higher estimate of the RAN capacity in order not to leave any bandwidth unused. One way to have an estimate of the RAN capacity is to examine the highest throughput sent to the cell over the recent past, for example, over the last 7 days, 14 days, a month or the like. A record may be kept of the highest throughput sent and may be used as an estimate for the RAN capacity. Other methods for determining the RAN capacity may be used.

An Intent Based Shaping method is intended to allocate capacity proportionally across the various service categories, based on the minimum intent and the target intent for each service category. First, bandwidth may be allocated to meet the minimum intent across all service categories. Any leftover bandwidth can then be distributed across the service categories based on the differential between minimum and target intent. An example of one type of a system and method for performing intent based traffic flow management is detailed in U.S. patent application Ser. No. 16/579,272, filed Sep. 23, 2019.

Embodiments of the system and method detailed herein are intended to measure QoE across all service categories and define a specific sequence in reducing the minimum and target Intent of each of the service categories to maintain the QoE across all the various service categories. The amount of reduction in video traffic/tonnage is intended to be done only to the extent that is needed. For video, the QoE may be lowered to an acceptable level to help free up tonnage/bandwidth.

In some cases, actions to manage video streaming traffic/tonnage could include, for example, reducing video quality only during busy hours on all locations or select locations to manage median QoE. In further cases, embodiments of the system and method may monitor the QoE (for example, as measured by a score based on traffic flow parameter) for other service categories such as web, gaming and the like and reduce the video minimum and target intent. When the combined QoE of the other service categories falls below an acceptable limit, the system and method are configured to reduce the minimum and the target Intents for video. This reduction will lower the QoE of the video category slightly while freeing up considerable bandwidth to be used by other service categories. The reason that considerable bandwidth is freed up is because the video streaming flows are high bandwidth flows, and if the number of video users is high, then the resulting bandwidth freed up could be considerable.

In another further case, embodiments of the system and method may monitor an individual QoE (for example, as measured by a score based on traffic flow statistics) for each of the other service categories such as web, gaming, and the like, and reduce the video minimum intent, and other service categories minimum intent. The distinction between this case and the case above is that in this case the individual QoE of each service category is monitored and accordingly the Intents are adjusted. If the expectations of the QoE for the service categories can be expressed as an Intent (or a score) for each of the individual service categories (for example, web, gaming, and the like), then it may be better to manage the QoE for each of the service categories.

In some cases, video flows may be allowed to fully consume the radio and other network resources. Embodiments of the system and method can be configured to set an appropriately high minimum and target Intent for video and the various service categories. It is intended that video users will get appropriately high QoE while also permitting users in the other service categories to also receive a high QoE. Embodiments of the system and method are intended to provide for the radio resources be fully utilized. In some cases, there may be no need to shape video traffic because these radio resources, if not used, will be left underutilized, which may result in lower QoE for subscribers.

In another example, network traffic grows due to increased number of video users, or increased number of users in other service categories. Thus, the measured user QoE of the other service categories degrades. In this example, embodiments of the system and method can be configured to automatically detect the lower measured user QoE scores and then appropriately lower the minimum and target intent of video streaming categories, and optionally other service categories in a predetermined manner as detailed herein. In this example, it may be expected that video users will get lower but still acceptable QoE. The lowering of intents will translate to lower bandwidth allocation across the various service categories.

Figure 7:
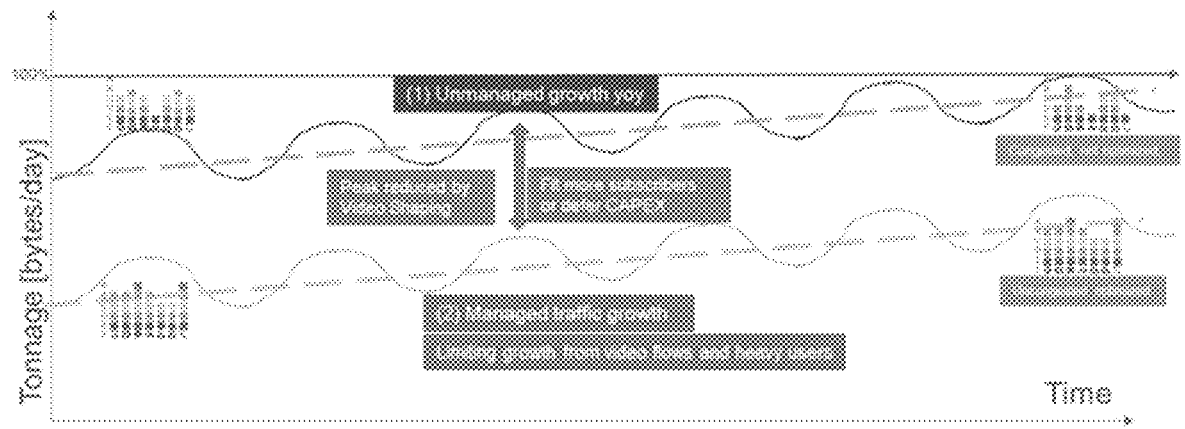
FIG. 7 illustrates radio capacity gains year over year based on use of an embodiment of the video streaming management system.

Embodiments of the system and method are intended to provide for management of and/or a reduction in the video tonnage in a network while delivering acceptable QoE across the various service categories. FIG. 7 illustrates a potential radio capacity gain year over year with an embodiment of the system and method detailed herein. The top line illustrates the unmanaged traffic growth year over year. The bottom line illustrates the managed traffic growth where video tonnage is managed to an acceptable level despite the increase in the number of users, or in the volume of traffic flow. In this example, the y-axis (tonnage) is determined as follows: in an hour: total bits sent/sec*3600 sec/hour=total bits sent per hour. In a day: total bits sent/hour*24 hours/day=total bits (or bytes) per day. It will be understood that these results could be rolled up and aggregated over a week, a month, or the like to decide the total bytes/week and plotted as shown.

Figure 8:
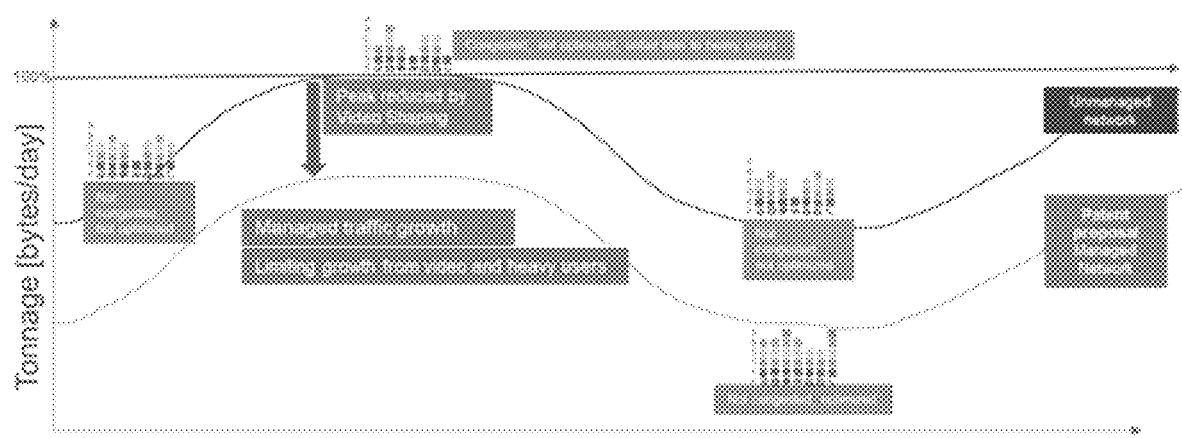
FIG. 8 illustrates radio capacity gains over a short period based on use of an embodiment of the video streaming management system.

FIG. 8 illustrates potential radio capacity gains within a short period, for example within a day, with the use of an embodiment of the system and method detailed herein.

Embodiments of the system and method are intended to provide a tradeoff between network cost and QoE for various service categories. The freed up bandwidth can be used for more new subscribers that will fit in the network. Hence embodiments of the system and method are intended to allow for deferred CAPEX investments. Further, embodiments of the system and method are intended to adapt quickly to changes in number of subscribers within a service category.

Embodiments of the system or method are intended to provide for the managing of video streaming traffic as well as other network traffic without any external input. Embodiments of the system and method are not intended to have to set strict limits on bandwidth allocation. Embodiments of the system and method are intended to determine the bandwidth allocation needed to achieve a certain Intended QoE.

Embodiments of the system and method are intended to accommodate any number of service categories. Each service category will have flows of certain traffic types, for example, YouTube™ and Netflix™ traffic flows may be bundled into one service category called the video service category.

Embodiments of the system and method are intended to align with advancements made by Over The Top (OTT) video providers in video optimization. Embodiments of the system and method are intended to support the optimization of traffic from OTT video providers, for example, YouTube™, Netflix™, Cloud Gaming, and the like. As new OTT applications are introduced, the system may allow for more service categories, each with its respective Target and Minimum intents. Not only can the number of service categories be extended, each operator may assign different types of applications to a given service category. For example, Operator 1 may assign all YouTube™ and Netflix™ flows into one video service category. Operator 2 may assign short-duration YouTube™ flows into a video service category, for example, Video_short and long duration YouTube™ and Netflix™ flows into a different video service category for example, Video_long and configure a target and/or minimum intent for each of these service categories.

It will be noted that many video traffic flows are typically long duration flows. While all users in the network, irrespective of their channel conditions, can generally invoke a video flow, it is the users in good channel conditions who typically consume most of the radio resources. It is desirable for a network operator to manage video traffic for all users to best meet the QoE for all the service categories. Embodiments of the system and method are intended to manage traffic growth for video with reasonably good QoE with the best QoE possible for the other service categories.

Figure 9:
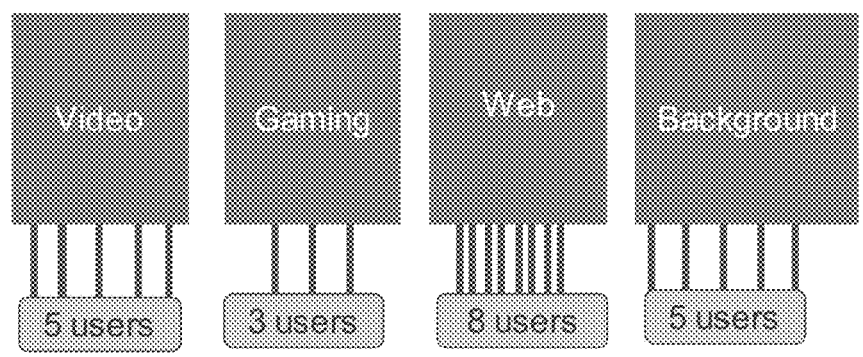
FIG. 9 illustrates an example of operator specific service categories.

A specific example of the method and system for managing streaming video is provided below. In this example, a few service categories besides the Video Streaming service category are included. In this example, the service categories include video, web, gaming and background traffic service categories. It will be understood that every network will have some Background traffic and this traffic will likely have the lowest priority. It will be understood that network operators may have various service categories and may have more or less categories than this example. An example of the various operator service categories are shown in FIG. 9. It will be understood that other categories such as Voice, Messaging and like may also be included as service categories.

For each service category a Minimum Intent and a Target Intent can be defined as shown in FIG. 10. It will be understood that these may be predefined by the system or may be determined by the operator and saved in the memory component of the system. Further, other types of Intent, for example, a maximum intent, or several levels of minimum intent or the like may be defined, for example, a minimum intent for peak times vs a minimum intent for medium times or the like. Each service category may be defined as a specific application type (for example: Video) with multiple applications (for example: YouTube™, Netflix™, and the like.) Each service category is evaluated based on an application specific QoE metric (for example, the operator may have a predefined target score 4 for gaming). It will be understood that these target scores may be predefined by the system or may be defined by the operator and saved in the memory component of the system.

Each application type may have target QoE that the network operator hope to maintain for all subscribers. Further, each application type will have minimum QoE that the network operator has determined as a minimum to be maintained for all subscribers.

Embodiments of the system and method are intended to manage Video Streaming traffic while ensuring good QoE for the other service categories.

Example embodiments of the method are detailed herein. Each of these embodiments is intended to allow video tonnage to be managed in an automated manner to best meet the QoE metrics for the various service categories. For these embodiments: the method can be configured to define a specific sequence of changing the minimum and target intents for the various service categories to provide for optimal QoE across all the service categories. The traffic in the video streaming service category is intended to be managed at a predetermined time interval, for example, every few minutes or the like, based on the measured QoE of each of the service categories, including video, during the predetermined time interval. An acceptable measured QoE of the other service categories may not require any further shaping of the video traffic that would degrade the video QoE. Low measured QoE of the other service categories could result in further management (for example, further shaping) of all the video traffic in an iterative manner, generally only up to the lowest acceptable level for the video QoE. If the QoE of the other service categories does not improve, despite the management of video traffic up to the lowest acceptable Intent, then the network may need to be upgraded with additional capacity in order to reach acceptable levels of QoE. This approach of managing the video traffic in the RAN in an automated, iterative manner, responsive to the QoE of the video traffic and other service categories allows for video tonnage in the RAN to be managed while delivering appropriate QoE levels across the service categories.

The following two examples provide some further detail. The differences in the examples is in the details of how the various non-video service categories are intended to be evaluated by the analysis module, whether individually (Example 1) or together (Example 2).

For example 1, the analysis module 110 is configured to set the Target Intent, Minimum Intent and the lowest possible minimum Intent for every service category. The mapping module 105 maps various application flows to a defined set of service categories.

FIG. 11 is a table illustrating an example of Target, Minimum and Lowest Possible Minimum Intent for various service categories, and their notation as used in this example.

For every service category, subscript 1 denotes a minimum Intent and subscript 2 denotes a target Intent. The minimum Intent specifies the lowest intent for the service category that is acceptable under normal operation.

As an option, an Intent lower than Minimum Intent is defined. Subscript 0 indicates the lowest possible minimum intent beyond which further degradation is unacceptable and that would trigger capacity upgrade. The setting of the lowest possible Minimum Intent is intended to be optional to the network operator and in some cases may be preconfigured by the system. This lowest possible minimum intent is configured to give the opportunity of lowering the minimum Intent beyond what is expected in normal course of operation, in order to decide capacity upgrade. If this is not an option, then an operator may decide to set P0=P1, or Q0=Q1, R0=R1, S0=S1, or the like. The upgrade of capacity may then be triggered when the minimum intents are breached across any one or more service categories.

The reason to have an intent option lower than the minimum intent is to allow the possibility that the minimum intent may be breached in rare instances with Operator acceptance. This includes situations where the network is overloaded due to sudden unusual traffic patterns, or where the network needs to service a substantially large number of subscribers for short intervals, for example, 15 min. 30 min or the like. In those cases, it may be permissible to have a user QoE that is lower than the minimum intent because these events are not regularly timed events, and are therefore much more unusual than normal course of operation.

In this example, the notation is as follows:
P2=Target Intent for Video
P1=Minimum Intent for Video
P0=Lowest possible Minimum Intent for Video
Q2=Target Intent for Web
Q1=Minimum Intent for Web
Q0=Lowest possible Minimum Intent for Web
R2=Target Intent for Gaming
R1=Minimum Intent for Gaming
R0=Lowest possible Minimum Intent for Gaming
S2=Target Intent for Background
S1=Minimum Intent for Background
S0=Lowest possible Minimum Intent for Background Within each service category, p, q, r, s are intended to denote the measured scores over a predefined period, for example 12 hours, a day, 2 days of the like.

After initialization of the system, a Link Shaper bandwidth will be set as an estimate of the RAN capacity. The capacity of a radio cell is not deterministic and may vary depending on, for example, the number of users, distance of users from the cell center within the cell that decides the path loss, and the like. Embodiments of the system and method are intended to provide an estimate of cell capacity. In some cases, the estimate may not be very accurate but may estimate a high bandwidth, which is intended to ensure that no bandwidth is left underutilized. Hence, the system and method are intended to function with an overestimate of the cell capacity, but it is preferable if the cell capacity is not underestimated. In one case, an estimate of the link bandwidth can be measured by examining the highest possible throughput that the cell has carried looking back in time.

The duration of look back may depend on the traffic dynamics within the cell and is generally in the order of for example, several hours, one day, two days or the like. It is intended to include the time duration during which there may have been high traffic demand within the network. These times may be, for example, such as when users are actively using the network in the evenings, or during weekends. That will allow for the measurement of cell throughput when the traffic demand and load on the network was at its highest. It is intended to reflect the ability of the cell to be able to handle that high traffic demand and estimate the cell capacity accurately.

This estimate of link capacity can change over the predefined time interval, for example, every few minutes. In a radio network, the capacity is variable depending on the number of users, user distribution in the cell and the like. It will be understood that there may be various ways to determine an estimation of the radio link capacity, which would be appropriate for embodiments of the system and method.

The method for managing video streaming may operate iteratively in order to manage video tonnage of the network. FIG. 12 is a graph illustrating an iterative approach in order to manage video tonnage via setting the Target, Minimum, and Lowest possible Minimum (if applicable). The triggers for each of the actions labeled (1), (2), (3), (4), (5) are detailed herein.

Figure 13:
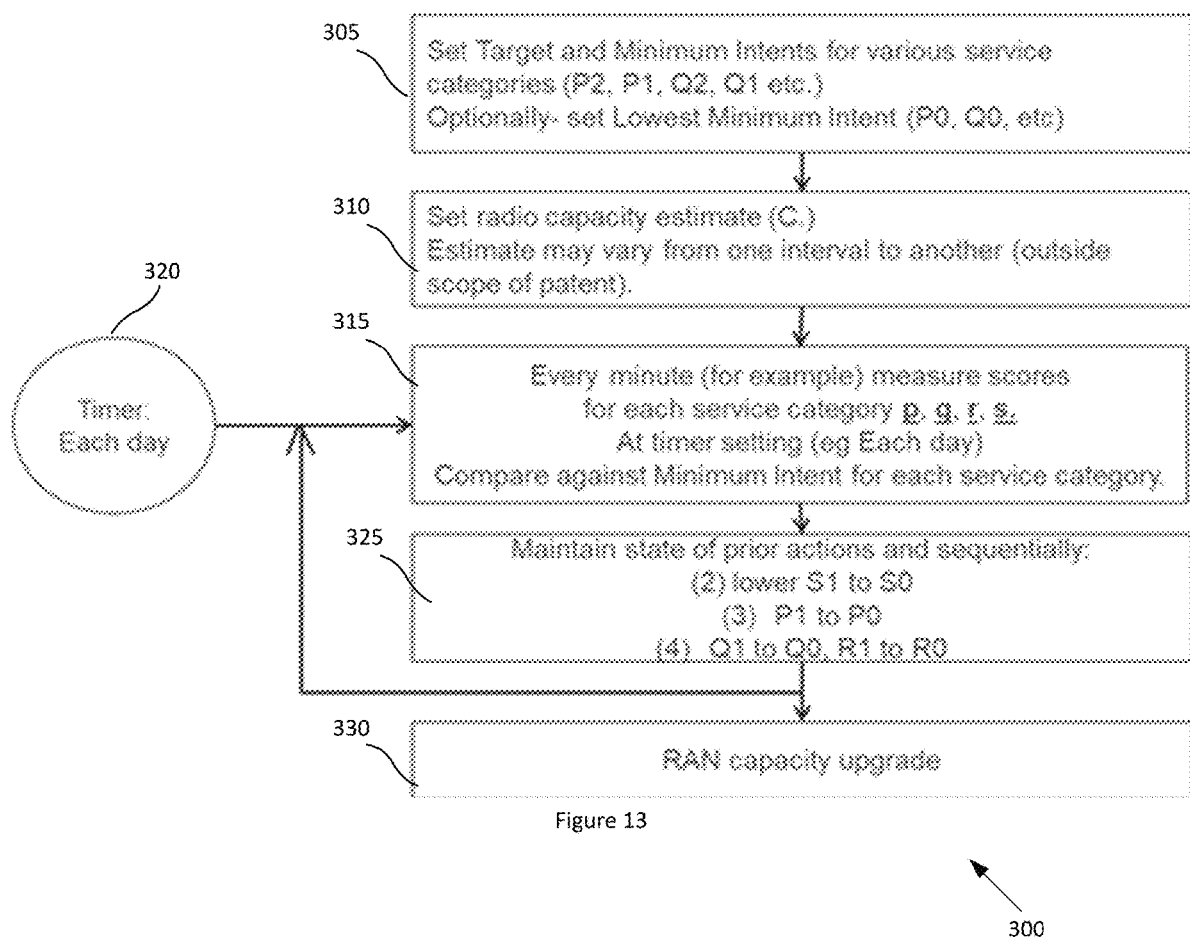
FIG. 13 is a flow chart of a method of managing Quality of Experience (QoE) according to an embodiment.

FIG. 13 illustrates a method 300 of video streaming management according to an embodiment. The system, at 305 is initialized as detailed herein with target and minimum intents set per service category. The radio capacity is estimated, at 310, by the analysis module 110. It will be understood that this may be estimated repeatedly as capacity may change periodically. The capacity can be estimated, for example, every 30 minutes, every hour, two hours, or the like, to allow for capturing the high peak load within the cell. This time duration is intended to be configurable by the operator depending on the traffic profile within the location. More frequent estimations may not offer further benefits while taking unnecessary computing resources. The mapping module 105 observes the traffic flow within the network and at predetermined time intervals, for example, ever 30 seconds, every minute, every 5 minutes, or the like, and scores are determined per category. The scores may be aggregated over subscribers per service. At the end of a timer period, at 320, for example, at the end of 12 hours, 24 hours, or the like, the analysis module 110 compares the predefined minim intent with the measured scores, at 315. At 325, if the minimum intent is not met, it may be lowered, for example to the lowest Intent and the shaping module may adjust at least one shaper with the new prioritization based on the new minimum intent. If the monitoring module determines no further category may be lowered, than the network operator is signaled that a capacity upgrade is desirable, at 330.

Figure 14:
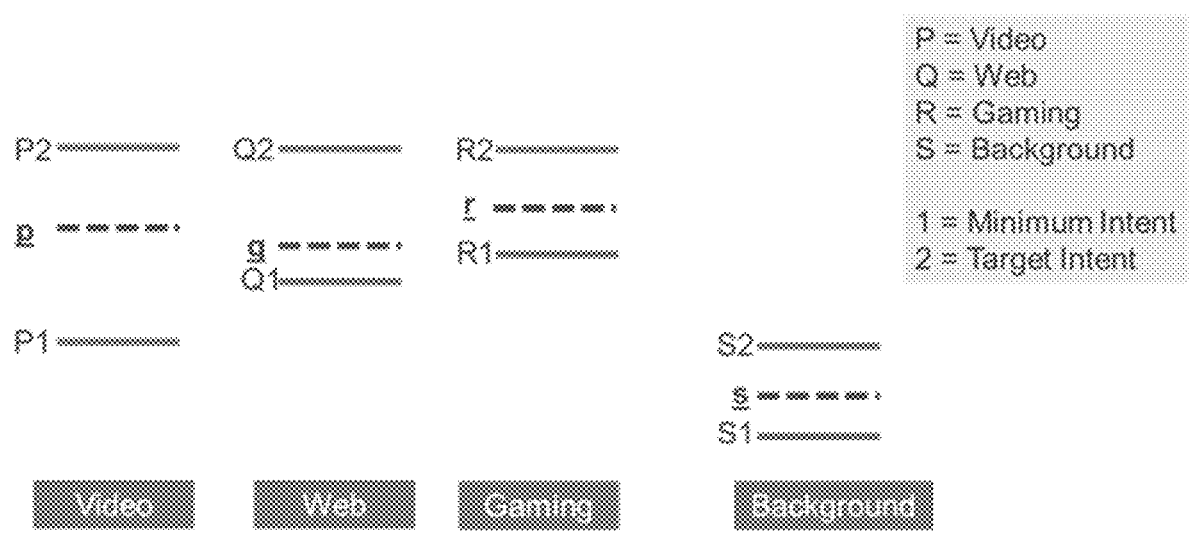
FIG. 14 illustrate a default mode of operation in an uncongested network.

FIG. 14 illustrates an example of measured score. The dotted line is an example median of the averaged measured user scores for that service category at a predetermined time interval, in the timer period, for example in the last 24 hours. The measured scores shown by the dotted lines are denoted by p, q, r, s. Each of the time intervals (which in this example are shown as 1 min and 24 hours) are configurable by the operator based on the responsiveness desired and the traffic dynamics. In FIG. 14, the service categories, including video, are able to meet their specified minimum Intent. In some cases, the service categories may even be able to meet and exceed their Target Intent during some of the predetermined time intervals.

Figure 15:
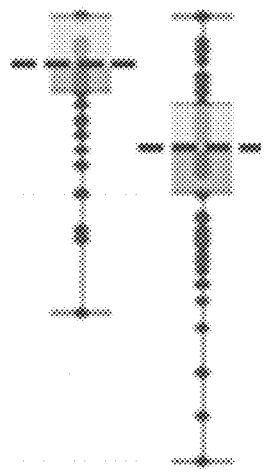
FIG. 15 illustrate a measured median score per service category.

Each predetermined timer period, which in this example is each day, the measured Intent is determined for each service category by averaging the collected scores for that specific category at the predetermined time interval, in this example, every 1 minute. The median may then be taken over a period for evaluation, for example, 5 days, 1 week, 2 weeks or the like. Taking the median of scores instead of average is intended to avoid an outlier effects. FIG. 15 is an illustration of an example measurement at the predetermined time intervals collected over the previous time period, for example, 24 hours, for two service categories, for example, video streaming and web. In this example, the number of dots equals the number of 1 minute intervals in 24 hours which equals 1440. The dotted line shows the median average user score. Other options for determining this measurement may include estimation of the mean, or the maximum or the 95th percentile of all the interval scores over for example, 5 days, 1 week, 2 weeks or the like.

In a practical implementation, borrowing may be enabled between service categories. Applications such as web browsing are often considered bursty network traffic. Therefore, when the web service category is not using the allocated bandwidth, other service categories may access the unused bandwidth that is available to web. It will be understood that this borrowing is not intended to affect the target or minimum intent, but allow for the service categories to fully utilize the available bandwidth.

Figure 16:
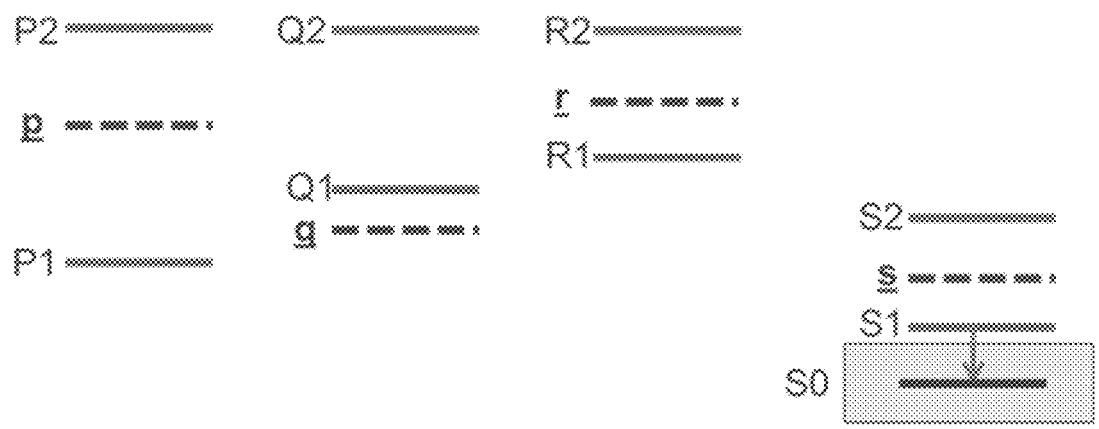
FIG. 16 illustrates lowering minimum intent according to an embedment.

In this example, the analysis module 110 determines that the traffic load has grown. After measuring the averages over a few days, it is determined that the minimum Intent for Q(Web) and/or R(Gaming) is not being met. FIG. 16 illustrates the case where the intent for Web traffic measured and averaged over a few days, falls below the minimum intent for Web. It will be understood that this could equally apply if the minimum Intent for Gaming is not being met.

The shaping module is configured to lower the minimum Intent for Background traffic since this service category is generally considered to be the lowest priority.

The system is configured to lower S1 in steps till it is equal to S0. It is not necessary to lower S1 to S0 in one movement. Instead, the system, via the shaping module 115, may lower S1 in small steps and after each iteration, the monitoring module 120 may measure the intent of each of the other service categories. If the intent for each service category is now being met, then there is no need to lower the minimum S1 further. Once the minimum intent for Background reaches S0, the system will refrain from lowering it any further. Each step within an iteration is intended to be completed in time for it to be useful, and responsive to traffic changes and dynamics without interfering with the other scheduling or routing mechanisms within the network. In a specific example, each step of an iteration may be made for example, every 30 min, every hour or the like.

Figure 17:
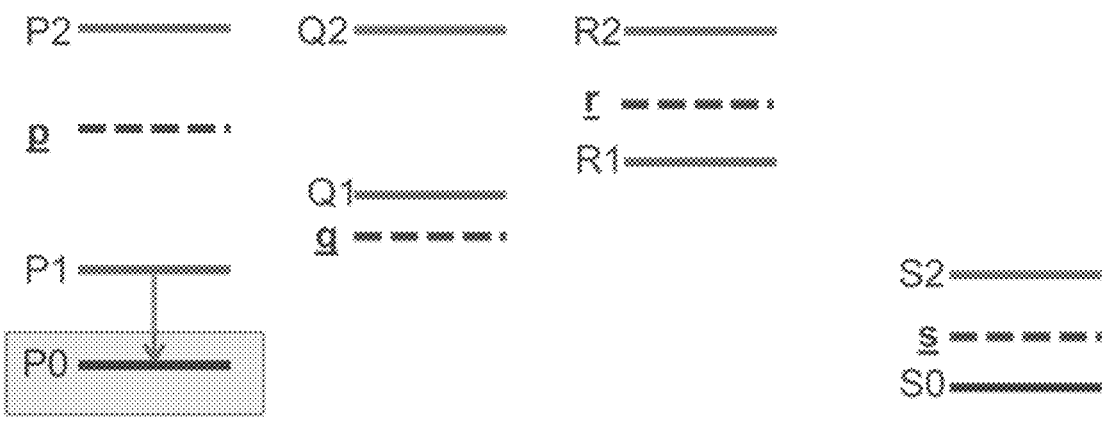
FIG. 17 illustrates lowering a further intent according to an embodiment.

The system may determine that there is further growth in the network traffic. The minimum Intent for Q(Web) and/or R(Gaming) is not being met. FIG. 17 illustrates an example where the intent for Web traffic measured and averaged over say a few days, falls below the minimum intent for Web.

The system, after having lowered S1, may now determine to lower the Minimum Intent for Video Streaming in small iterations. The shaping module may lower P1 in predetermined amounts until the intent is reduced to P0. It is intended that the system will lower P1 to P0 in various iterations. After each time P1 is lowered, the monitoring module is configured to measure the intent of each of the other service categories. If the service categories are meeting their minimum intent, then there is no need to lower the minimum P1 further. Once the minimum intent for Video Streaming reaches P0, the system will cease to lower this limit.

As the minimum intent is lowered, the end subscriber will experience video at a lower resolution because the bandwidth allocation for the video category is lower for the same number of users. The user end equipment will therefore request video at lower and lower codec rates. The appropriate choice of P0 is made by the operator after running trials and deciding whether a 360 p encoder is acceptable to the end user. The process of determining the mapping between the encoder rates (for example, 360 p, 480 p, 1080 p, and the like) to the Intent Score is an iterative heuristic process. In some cases, this may be learnt after trial and error. In, in this example, the lowest level acceptable encoder rate is 480 p, then the operator will look to see what level of P0 setting corresponded to the 480 p in an earlier run.

Figure 18:
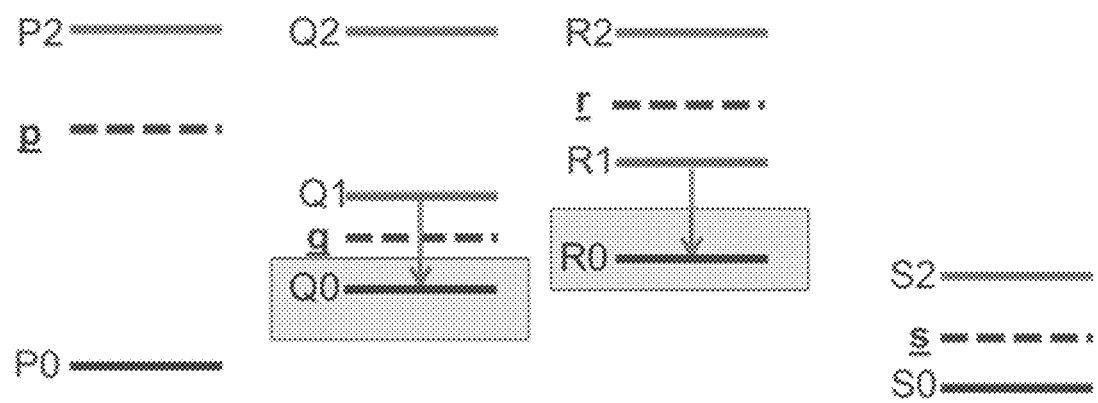
FIG. 18 illustrates lowering a still further intent according to an embodiment.

The monitoring module 120 continues to monitor the traffic on the network and may determine that there is further traffic growth. The minimum Intent for Q(Web) is shown as not being met in FIG. 18. It will be noted that this decline is after P1 has been reduced to P0 and as such, will not be lowered further by the system. FIG. 18 illustrates a case where the intent for Web traffic measured and averaged over say a few days, falls below the minimum intent for Web.

The system may now be configured to lower the Minimum Intent for Gaming and/or Web or the remaining service categories available to the system. In this example, the system may lower Q1 in iterations until it is reduced to the lowest allowable value of Q0. Lin other cases, or after Q1 has been lowered, the system may then lower R1 in iterations until it has been reduced to the lowest allowable value of R0. The order of priority between Web and Gaming can be set by the operator. In some cases, the system may alternate between one step for Q1 and one step for R1. That way, both service categories may be lowered together, without one of them having to be lowered completely before starting the lowering of the other service category.

As before, the transition from Q1 to Q0, and R1 to R0 happens iteratively in multiple phases by observing the measured QoE on each of the other service categories such as web, gaming and the like.

The monitoring module will continue to monitor the traffic on the system. If traffic growth is detected, and the minimum Intent for P(Video Streaming), Q(Web), R(Gaming), S(Background Traffic) have already been lowered, it will be determined that no further reduction of the minimum intent is possible. As such, the QoE across the various service categories has reached and possibly breached the lowest allowable Intent the capacity of the network will need to be upgraded to improve the QoE to a desirable level.

Figure 19:
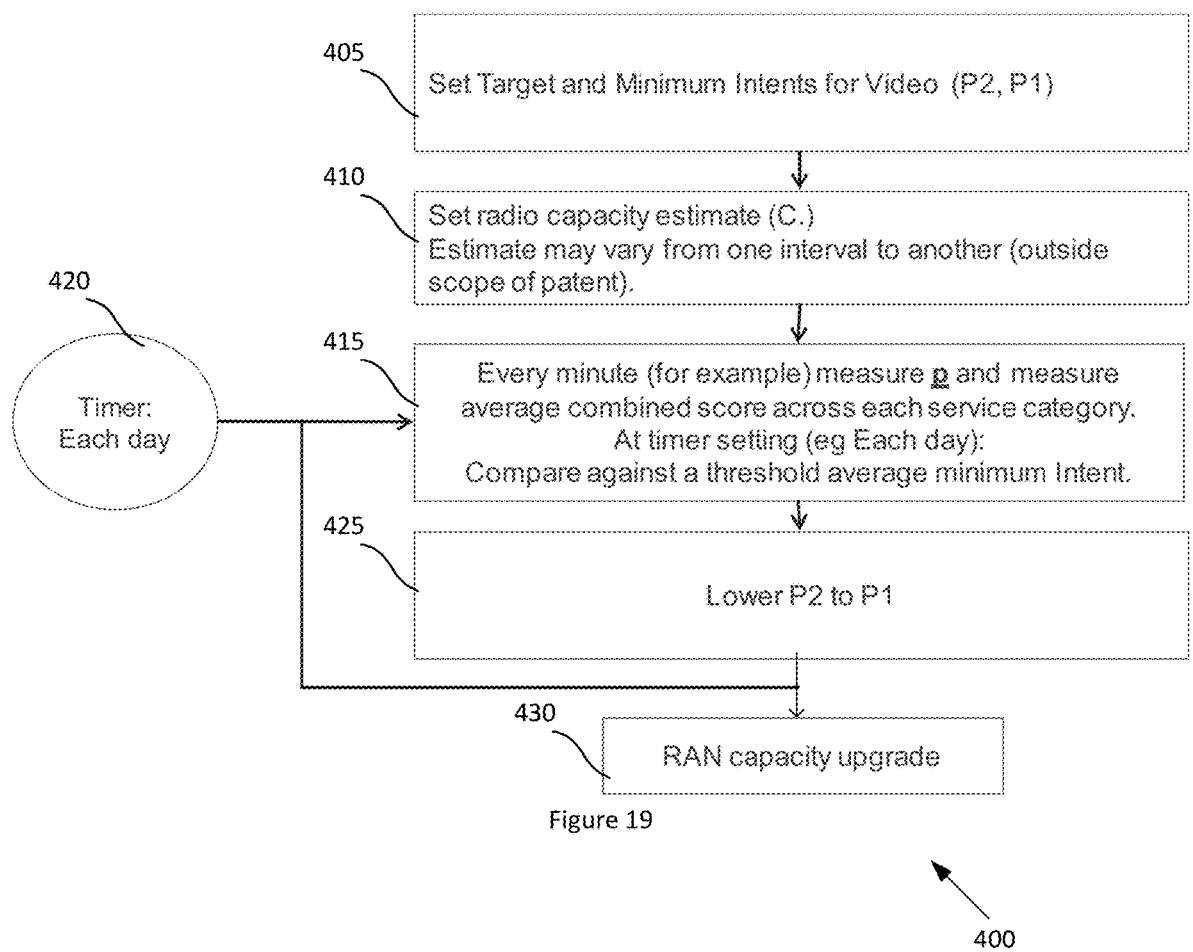
FIG. 19 illustrates a method for managing Quality of Experience (QoE) according to a further embodiment.

In a second example, the system may only manage the Minimum and Target Intent for Video Streaming service category. An embodiment of the method 400 for automated video streaming management is shown in in FIG. 19. The system is initialized, and Target Intent and Minimum Intent for Video service category, at 405. In this example embodiment, the target Intent and minimum Intent of the other remaining service categories are combined. Thus, there is one value for the target Intent for the combined non-video service categories and one value for the minimum intent for the combined non-video service categories.

The system is determines an estimate of the RAN capacity and sets the link shaper bandwidth based on the capacity, at 410. The mapping module 105 determines the traffic flows and maps the traffic flow to an appropriate service category.

The system is configured to iteratively perform a method for video streamlining management according to an embodiment detailed herein. Based on the minimum Intent and the target Intent, the analysis module 110 determines the minimum and the target bandwidth for Video Streaming service category and the shaping module sets these limits in order to provide for traffic prioritization on the network, at 415.

At 420, at every timer period, for example, every 12 hours, every 24 hours or the like, the analysis module is configured to determine a median of the averaged user scores for video. In addition, the analysis module may measure the average user scores for all other service categories combined. In this example, all the other service categories besides video are grouped into a single service category and the median of average score is measured across all the service categories to determine if these other services are meeting an appropriate QoE.

If the median measured user score of the other categories falls below a preset threshold corresponding to an average score associated with acceptable QoE for example a score of 3, then the Target Intent for video is lowered, at 425. The shaping module 115 is configured to iteratively adjust the Target Intent for video continues till the Target Intent for video reaches just slightly above the Minimum Intent. Beyond that, the RAN may be required to be upgraded in order to satisfy an appropriate QoE, at 430.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for Quality of Experience (QoE) management on a network, the method comprising:
    determining a set of service categories for a network operator's traffic, wherein at least one of the service categories is video streaming;
    mapping a plurality of traffic flows to each of the service categories;
    determining a target and minimum bandwidth intent for each of the service categories for the network operator;
    measuring a score, based at least in part on the Quality of Experience of a set of users, wherein the set of users comprises a subset of total users of the network, and bandwidth use for each of the service categories;
    determining whether each of the service categories are reaching an associated minimum bandwidth intent;
        if the minimum bandwidth intent is not being reached for at least one service category, reducing the minimum bandwidth intent for the video streaming service categories;
        allocating a bandwidth per service category based on the reduced minimum bandwidth intent; and
        shaping the traffic flow to the allocated bandwidth;
        otherwise allowing the traffic flow to continue with a current bandwidth allocation.

2. The method of claim 1 wherein, the set of service categories comprises video streaming as a first service category and all other traffic as a second service category.

3. The method of claim 1, wherein the set of service categories comprises a service category for each of background traffic, gaming traffic, web browsing traffic, video streaming traffic, and voice/messaging traffic.

4. The method of claim 3 wherein the minimum bandwidth intent is adjusted for the background traffic service category after adjusting the minimum bandwidth intent for the video streaming service category.

5. The method of claim 1, wherein minimum bandwidth intent for each service category is not lowered below a predetermined lower threshold.

6. The method of claim 1, wherein measuring the score and bandwidth for each service category comprises:
    determining an average user score for the set of users having traffic flows associated with the service category.

7. The method of claim 6 wherein the average user score is determined over a predetermined interval of time.

8. The method of claim 1 further comprising:
    monitoring the score and bandwidth for each service category;
    determining whether there has been a change in score and bandwidth for any of the service categories;
    if there has been a change and the score and a service category is no longer meeting the minimum bandwidth intent, further adjusting the minimum intent for at least one of the service categories;
allocating a bandwidth per service category based on the adjusted minimum bandwidth_intent; and
shaping the traffic flow to the allocated bandwidth; otherwise allowing the traffic flow to continue with a current bandwidth allocation.

9. A system for Quality of Experience (QoE) management on a network, the system comprising:
at least one processor and a memory storing instructions, that when executed by the at least one processor, cause the system to execute:
a mapping module configured to determine a set of service categories for a network operator's traffic, wherein at least one of the service categories is video streaming and to map a plurality of traffic flows to each of the service categories;
an analyzing module configured to determine a target and minimum bandwidth intent for each of the service categories for the network operator, measure a score, based at least in part on the Quality of Experience of a set of users, wherein the set of users comprises a subset of total users of the network, and bandwidth use for each of the service categories and determine whether each of the service categories are reaching an associated minimum bandwidth intent; and
a shaping module configured to reduce the minimum bandwidth intent for the video streaming service categories if the minimum bandwidth intent is not being reached for at least one service category, allocate a bandwidth per service category based on the adjusted minimum bandwidth intent and shape the traffic flow to the allocated bandwidth.

10. The system of claim 9 wherein, the mapping module is configured to determine video streaming as a first service category and all other traffic as a second service category in the set of service categories.

11. The system of claim 9, wherein the mapping module is configured to determine a service category for each of background traffic, gaming traffic, web browsing traffic, video streaming traffic, and voice/messaging traffic.

12. The system of claim 11 wherein the shaping module is configured to adjust the minimum bandwidth intent for the background traffic service category after adjusting the minimum bandwidth intent for the video streaming service category.

13. The system of claim 9, wherein the shaping module is configured to not lower the minimum bandwidth intent for each service category below a predetermined lower threshold.

14. The system of claim 9, wherein when measuring the score and bandwidth for each service category the analysis module is configured to:
determine an average user score for the set of users having traffic flows associated with the service category.

15. The system of claim 14 wherein the average user score is determined over a predetermined interval of time.

16. The system of claim 9 further comprising:
a monitoring module configured to monitor the score and bandwidth for each service category and determine whether there has been a change in score and bandwidth for any of the service categories;
wherein, if there has been a change and the score and a service category is no longer meeting the minimum bandwidth intent, the shaping module is configured to further adjust the minimum bandwidth intent for at least one of the service categories; allocate a bandwidth per service category based on the adjusted minimum bandwidth intent; and shape the traffic flow to the allocated bandwidth.

17. The method of claim 1 wherein the subset of users comprises: users with a prior history as heavy users or suffering users.

18. The system of claim 9 wherein the subset of users comprises: users with a prior history as heavy users or suffering users.

* * * * *